(12) United States Patent
Wurzburger et al.

(10) Patent No.: US 6,790,352 B1
(45) Date of Patent: Sep. 14, 2004

(54) PROCESS FOR TREATING ACID MINE WATER WITH MODERATE TO HIGH SULFATE CONTENT

(76) Inventors: Stephen Ray Wurzburger, P.O. Box C, Goodyear's Bar, CA (US) 95944; J. Michael Overton, 1127 Nickel Ln., Yuba City, CA (US) 95992

( * ) Notice: Subject to any disclaimer, the term of this patent is extended or adjusted under 35 U.S.C. 154(b) by 0 days.

(21) Appl. No.: 09/616,134

(22) Filed: Jul. 13, 2000

Related U.S. Application Data

(63) Continuation-in-part of application No. 08/984,564, filed on Dec. 3, 1997, now Pat. No. 6,110,379, which is a continuation of application No. 08/613,606, filed on Mar. 11, 1996, now Pat. No. 5,698,107.

(51) Int. Cl.[7] .............................................. B01D 35/00
(52) U.S. Cl. ..................... 210/195.1; 210/196; 210/202; 210/203; 210/204; 210/205; 210/257.1; 210/259; 210/295; 210/314; 210/323.1; 210/513
(58) Field of Search .............................. 210/194, 195.1, 210/196, 198.1, 200, 201, 202, 203, 204, 205, 252, 257.1, 259, 295, 314, 322, 323.1, 513

(56) References Cited

U.S. PATENT DOCUMENTS

| | | | |
|---|---|---|---|
| 4,059,513 A | * | 11/1977 | Zadera |
| 5,698,107 A | | 12/1997 | Wurzburger et al. |
| 5,800,716 A | * | 9/1998 | Clarke et al. |
| 6,174,444 B1 | * | 1/2001 | Smit |

* cited by examiner

*Primary Examiner*—Betsey Morrison Hoey

(57) ABSTRACT

An apparatus for treating water contaminated with metal sulfates and sulfuric acid such as acid mine drainage (AMD) which in part recycles high pH effluent from later steps in the process back to the earlier steps of the process. The recycled high pH effluent added with magnesium hydroxide to the entering AMD generates precipitates separable from the stream to leave sulfate ladened water. A tangential filtering process is used to separate the sulfate ladened water into one stream of pure water and a second stream containing sulfate. One portion of the second stream is treated with ammonia to yield a cake of ammonia sulfate and aqueous ammonia. $Ca(OH)_2$ is added to another portion of the second stream to produce calcium sulfate cake and the high pH effluent that is recycled back to the first step in the cycle.

27 Claims, 2 Drawing Sheets

PROCESS FOR TREATING ACID MINE WATER WITH MODERATE TO HIGH SULFATE CONTENT

CROSS REFERENCE TO EARLIER FILED APPLICATIONS

This application is a continuation of application Ser. No. 08/984,564 filed Dec. 3, 1997 now U.S. Pat. No. 6,110,370 which was a continuation of application Ser. No. 08/613,606 filed Mar. 3, 1996 now U.S. Pat. No. 5,698,107 from which priority is claimed.

FIELD OF THE INVENTION

This invention relates to water purification and particularly to a system for cleaning water from mining operations.

Mining activities in the western United States have created thousands of Acid Mine Drainage (AMD) generation sites. The contamination level of each site differs as to the number of metal contaminants and the acid content of the waste stream.

These contaminants are usually a mixture of heavy and light metals such as iron. copper zinc, magnesium, manganese, aluminum, cadmium, nickel and lead. the acid and sulfate levels vary greatly.

U.S. Pat. No. 5,698,107 to Wurzburger et al discloses a process that is capable of treating heavily contaminated acid mine water. The high metal ion content and acid levels of such waste streams are highly electrically conductive and therefor easily treated by this process.

Iron Mountain Mine near Redding Calif., and the Leviathan Mine in Alpine County, Calif.

These three sites are unique in that they contained moderate to very high concentrations of dissolved metals and sulfates.

At the time that the treatibility studies were being done, AMD from Iron Mountain Mine had a soluble sulfate level of 10,800 parts per million, AMD from Berkeley Pit had a soluble sulfate level of 6930 parts per million which are rising at almost 10% per year and AMD from the Leviathon mine had 5900 part s per million.

State of the art AMD treatment technology use a variation of a liming process to raise the pH causing most of the metals to precipitate and to reduce sulfates. Unfortunately, these processes precipitate tons of hazardous waste which is a mixture of metal hydroxides and calcium sulfate. The handling cost required to dispose of this material is 300 to 400% of the actual water treatment cost.

U.S. Pat. No. 5,698,107 disclosed a three stage process in which lime was used only in the second stage to create a metal free anhydrous calcium sulfate cake. Although this material is safe for on-site storage and could have value as a soil conditioner, the process is an expensive use of valuable sulfate compounds.

Separation of sludges of precipitated matter is an inherent problem in the present art of water treatment. There are many technologies in which filtration systems have been devised to separate solid matter from liquids. In one type of filter constuction, developed for the separation of colloidal suspensions, the raw liquid flows tangent to an absorbing (cloth) medium. The absorbing medium absorbs the permeate from the stream and is drawn off the side of the absorbing (filtering) medium opposite the stream thereby continuously increasing the concentration of the colloidal suspension in the stream.

This method of filtration is referred to herein as "tangential filtration". A system incorporating this method of filtration adapted for filtering colloidal suspensions using a filter element having a tosion resistanct fiber structure is diclosed in U.S. Pat. No. 5,725,767 to Culkin which is hereby incorporated by reference into this specification.

OBJECTS OF THE INVENTION

It is an object of this invention to provide a method for processing AMD initially having a low concentration of metal (such as the discharge from the drainage produced from the process disclosed in U.S. Pat. No. 5,698,107) to virtually non-detectable concentrations.

It is another object of this invention to apply a novel technology involving the use of membranes to remove any metal and sulfate contaminants remaining in water discharged from the disclosed processes of the prior art.

As an additional benefit of the invention, it is an object to produce a sulfate rich side stream of sufficiently high concentration to have commercial value.

It is contemplated to use a tangential filtration system in a novel application wherein the stream is directed against a membrane that will pass only free water molecules thereby preventing unprecipitated cations and most all anions from entering the discharge stream. This aspect of the invention is particularly valuable in certain situations where safety must be considered.

It is another object of this invention to generate a high pH effluent from part of the waste stream containing sulfate ladened water that is used as the source of hydroxide in the demetallized stage of the invention.

It is another object to add ammonium hydroxide to a remaining portion of the sulfate stream to generate ammonium sulfate fertilizer.

SUMMARY OF THE INVENTION

This invention is directed towards a process for mixing precipitating agents containing a high pH effluent with AMD to generate pure water, aqueous ammonia and cakes of calcium sulfate, ammonium sulfate. All of these compounds are intended for commercial distribution.

The apparatus for performing the method of this invention is best described as comprising three sections, I, II, III. In the context of this specification, a "high pH effluent" is understood to contain OH and a cation ($K^+$) in a ratio greater than 400/20 by weight. "Sulfate ladened water" is understood to mean water containing more than 1000 ppm. The term, "purified water", is understood to mean water having less than 100 ppm impurity content. The term, "demetallized water" is understood to mean water containing less than 1 ppm metal ions.

Section I

Untreated AMD enters section I to which is added a precipitating agent of $Mg(OH)_2$ and high pH effluent from section II. Precipitation of metal hydroxides ensue which is separated as a cake leavng a stream of "demetallized water" It is a feature of this invention that "tangential filtration" is used to separate purified water (as defined above) from sulfate ladened water (defined above).

This is a wholly unexpected result in view of the fact that "tangential filtration" has been used prior to this disclosure to separate colloidal suspensions from water and its use to filter out sulfate ions has not been reported heretofore.

Section I produces purified water and sulfate laden water.

Section II

One portion of sulfate ladened water from section I is mixed with $Ca(OH)_2$ and enters section II where there is produced a calcium sulfate cake and high pH effluent. The cake is conveyed out of section II preferably for commercial distribution. The high pH effluent is conveyed out of section II back to section I where it is used as a prcipitating agent as discussed above.

Section III

The remaining portion of sulfate ladened water from section I is mixed with ammonia to produce anhydrous ammonia sulfate cake and aqueous ammonia suitable for commercial distribution.

Various features, aspects and advantages of the present invention will become better understood with regard to the following description, appended claims, and accompanying drawings.

DESCRIPTION OF A PREFERRED EMBODIMENT

Figure 1:
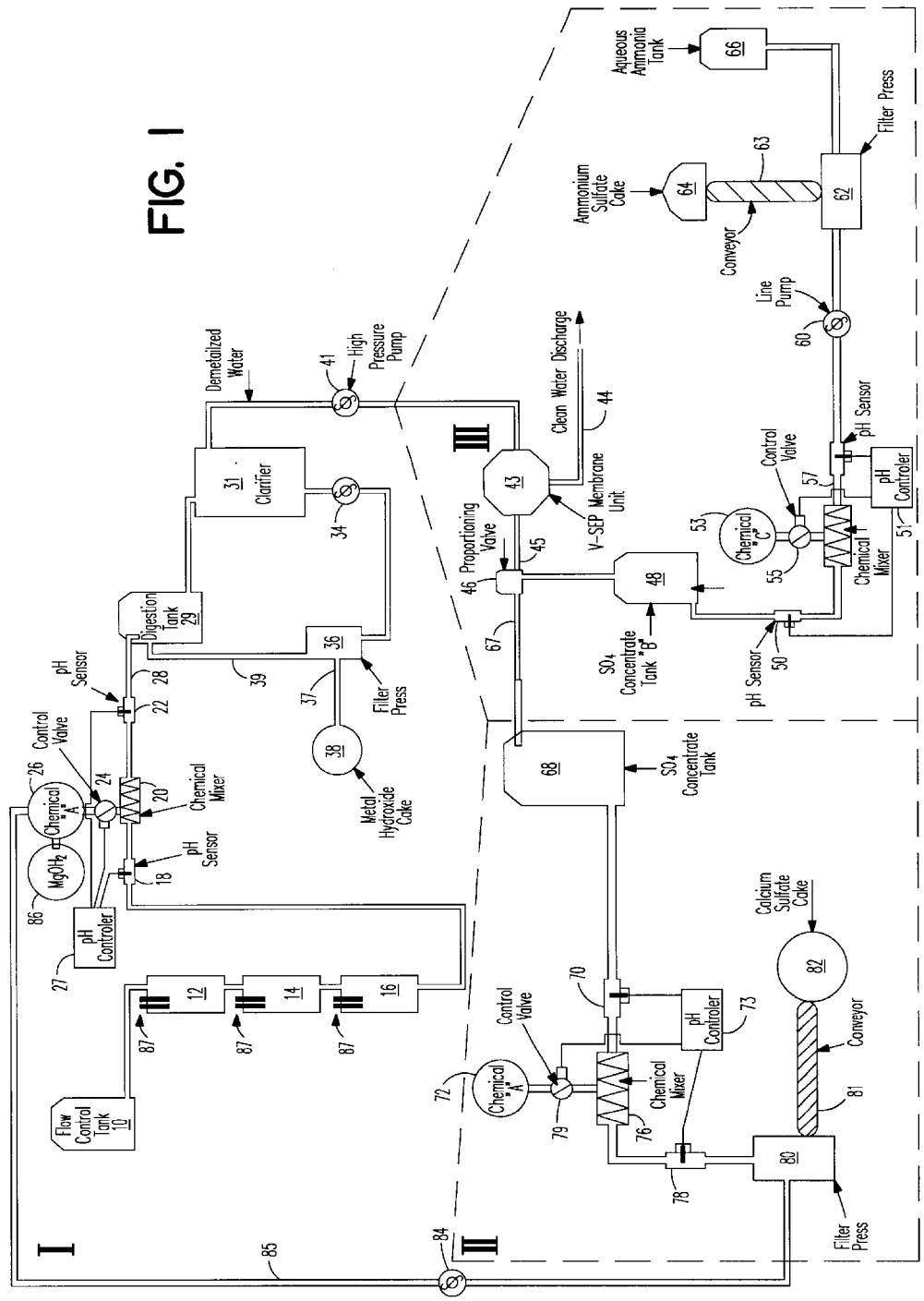
FIG. 1 is a schematic diagram of the apparatus for performing the method of this invention.

Turning now to a discussion of the drawings, FIG. 1 is a schematic diagram of the apparatus of this invention. FIG. 1 is shown in three sections.

The AMD enters section I from storage tank 10 and passes through three series connected ion state modification reactors 12, 14, 16.

Each reactor contains a pair of carbon electrodes and the voltage across the electrodes is 9–12 volts for reactor 12, 24–40 volts for reactor 14, 45–60 volts for reactor 16.

The stream then passes into a mixer 20 where it is mixed with a precipitating agent A from reservoir 26. Flow of precipitating agent A into mixer 20 is regulated by valve 24 controlled by pH controller 27 responsive to pH sensors 18 and 22. Chemical A is a mixture of $Mg(OH)_2$ and high pH effluent from the filter press 80 of section II.

The stream is passed into a digestion tank 29 where precipitation takes place forming a sludge of metal hydroxides which settles out in digestion tank 29 leaving "demetallized" water. The demetallized water from digestion tank 29 flows to clarifier 31. The sludge is delivered to a filter press 36. Metal hydroxide cake generated by filter press 36 is carried by conveyor 37 to a depository 38 preferably for commercial distribution. Demetallized water from filter press 36 is pumped by high pressure pump 34 into clarifier 31.

Demetallized water leaving clarifier 31 is pumped under high pressure by pump 41 through a tangential filtration system The filtration system 43 is preferably a V-Sep Membrane unit 43 which discharges clean water out through conduit 44 and sulfate laden water to a proportioning valve 46. Part of the sulfate laden water is delivered to section II for reuse in the process and to generate calcium sulfate cake. The remaining part of the sulfate ladened water is delivered to section III for use in generating amnonia and ammonia sulfate cake.

Proportioning valve 46 delivers part of sulfate ladened water to storage tank 68 from where it is delivered to mixer 76 in section II. $Ca(OH)_2$ from reservoir 72 is also added to mixer 76 forming a sludge that is delivered to a filter press 80. $Ca(SO)_4$ cake is conveyed by conveyor 81 from filter press 80 to repository 82 preferably for commercial distribution. High pH filtrate from filter press 80 is pumped by pump 84 back to chemical tank 26 of section I for use as a precipitating agent.

The addition of $Ca(OH)_2$ to mixer 76 is regulated by valve 79 controlled by pH controller 73 responsive to signals from sensors 78 and 70.

A remaining portion (about ⅔) of sulfate laden water (not needed for redirection back to section I) is directed by proportioning valve 46 to holding tank 48 of section III. From holding tank 48, the sulfate ladened water is delivered to mixer 52 where ammonium hydroxide from reservoir 53 is added to form a ammonia sulfate fertilizer cake. The sludge is forced by pump 60 through filter press 62 which ejects ammonium sulfate cake, conveyed to repository 64 preferably for commercial distribution. The filtrate, aqueous ammonia, from filter press 62 is stored in repository 66 preferably for commercial distribution.

Addition of ammonia to mixer 52 is regulated by valve 55 controlled by pH controller 51 responsive to signals from sensors 50 and 57.

Figure 2:
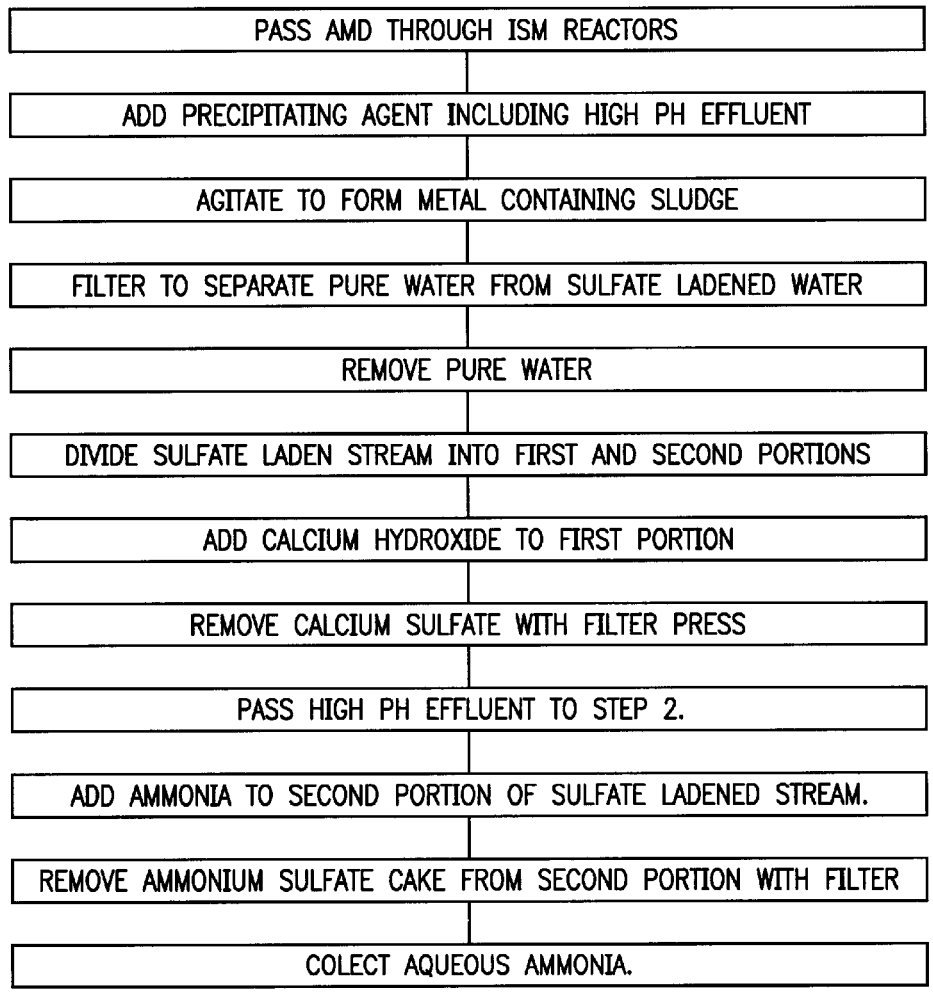
FIG. 2 is a flow chart of the method of the invention.

FIG. 2 is a flow chart of steps that are followed for performing the process using the apparatus of FIG. 1.

Step 1: AMD is passed sequentially through at least one "ion state modification" chambers or reactors. Each chamber has a pair of electrodes, preferably carbon electrodes. The electric potential across the electrodes is selected to optimize the "conditioning" of a particular group of ionic species. Ionic members of each group have a common valence (e.g., single valence, double valence, triple valence)

Step 2: A first chemical agent is added to AMD and mixed in the presence of a magnetic field in sufficient amount to raise the pH to a range of 7.5 to 8.5. A preferred first chemical agent is prepared according to steps listed in following paragraphs.

Step 3: The mixture is agitated in a tank for about thirty minutes during which a slurry of precipitates is formed and the pH stays at least 8.0.

Step 4: The AMD enters a settling tank or clarifier where precipitate is separated as sludge from clarified liquid fraction and the sludge is further dewatered by passage through a filter press. At this point in the process, almost all of the original contaminating metal ions have been removed from the AMD and the AMD is said to be "demetallized".

Step 5: The demetallized wastewater enters a high-pressure pump and is pumped into a Torsion Resistant Filter structure (U.S. Pat. No. 5,725,767)(V-Sep) unit. This unit is equipped with a very fine membrane so as to pass only pure water out through the discharge line.

Step 6: The water that passes through the membrane is now metal free and has a sulfate level of 100 ppm or less and meets or exceeds all standards for discharge.

Step 7: The side stream from the V-Sep is passed through a proportioning valve where approximately ⅓ goes into holding tank A and the remaining ⅔ goes into holding tank B.

Step 8: The concentrated $SO_4$ solution is pumped from a holding tank A for concentrated solution through a pH sensor into a chemical mixer. Here a concentrated slurry of $Ca(OH)_2$ is injected into the chemical mixer. A precipitate of calcium sulfate is formed. The liquid is passed through a filter press to remove the calcium sulfate precipitate. The filtrate (a pure base) is pumped up into a tank where it is cycled back into the process to demetalize the AMD influent.

Step 9: The anhydrous calcium sulfate from the filter press is collected and can be used as a soil amendment or possibly as a building material.

Step 10: The concentrated solution of $SO_4$ from tank B is pumped into a second chemical mixer where ammonium hydroxide is injected. A sufficient amount of ammonium hydroxide is added so as to precipitate a a major amount of the sulfates and provide a filtrate of commercial grade aqua ammonia.

Step 11: the slurry is passed through a filter press where precipitates of ammonium sulfate as a cake, suitable for use as a fertilizer.

Step 12: The filtrate solution with remaining sulfate and free ammonia (aqua ammonia) is collected. This solution has practical use as a a fertilizer and is particularly adaptable for application by spraying.

Having presented a description of the apparatus and the steps for carrying out the process, there is presented in following paragraphs a number of examples of application of the invention that have demonstrated the success in achieving the objects of the invention.

EXAMPLES

Berkeley Pit Test

A 3½ gallon sample (pH=2.9) of AMD from the Berkeley pit was treated sequentially in three ISM reactors. having electrode potentials of 10, 15.5, and 54 volts respectively.

Treatment times in each reactor is determined by the concentration of each metal ion to be oxidized of reduced.

The pretreated AMD is mixed with $Mg(OH)_2$ and the pure base generated by this process. The pH is raised to 8.5 and the solution is permitted to digest for a period of up to thirty minutes.

The treated AMD is put into a clarification unit where the sludge of metal hydroxide was separated from the treated water.

| AMD FROM THE BERKELEY PIT BEFORE TREATMENT AVERAGE SAMPLE | | |
|---|---|---|
| Before the demetallizing step | | |
| EPA 200.7 | Al | 294.0 parts per million |
| EPA 200.8 | As | 2.6 parts per million |
| EPA 200.9 | Cd | 2.5 parts per million |
| EPA 200.7 | Cu | 185.0 parts per million |
| EPA 200.7 | Pb | >1.0 parts per million |
| EPA 200.7 | Ni | 1.0 parts per million |
| EPA 200.7 | Zn | 550.0 parts per million |
| EPA 300.0 | $SO_4$ | 10800 parts per million |

The demetallized AMD was tested and the residual metal contents were all below 400 parts per billion.

| After the demetallizing step | | |
|---|---|---|
| EPA 200.7 | Al | 290 parts per billion |
| EPA 200.8 | As | 20 parts per billion |
| EPA 200.9 | Cd | 30 parts per billion |
| EPA 200.7 | Cu | 185.0 parts per billion |
| EPA 200.7 | Pb | >1.0 parts per billion |
| EPA 200.7 | Ni | 1.0 parts per billion |
| EPA 200.7 | Zn | 550.0 parts per billion |
| EPA 300.0 | $SO_4$ | 6800 parts per million |

The 3½ gallons of demetallized Berkeley Pit AMD were treated with V-Sep membrane unit.

Approximately 2.65 gallons were passed by the unit as dischargeable water.

| DEMETALLIZED AND V-SEP TREATED AMD | | |
|---|---|---|
| EPA 200.7 | Al | ND > 100 parts per billion |
| EPA 200.8 | As | ND > 02 parts per billion |
| EPA 200.9 | cd | ND > 20 parts per billion |
| EPA 200.7 | Cu | ND > 100 parts per billion |
| EPA 200.7 | Pb | ND > 100 parts per billion |
| EPA 200.7 | Ni | ND > 10 parts per billion |
| EPA 200.7 | Zn | ND > 100 parts per billion |
| EPA 300.0 | $SO_4$ | 95 parts per million |

The side stream from the V-Sep membraned unit produces approximately 1.2 gallons with a concentration of 80,000 parts per million ($SO_4$) per 5.0 gallons treated.

The system has the capacity to produce 240 gallons of sulfate concentrate for every thousand gallons treated.

The system has the capcity to generate 14,400 gallons of sulfate concentrated water for delivery to the pure base generation unit from which 13,000 gallons of pure base water and 9,630 pounds of anhydrous calcium sulfate cake is generated.

In one embodiment of the invention, the remaining ⅔ of the sulfate concentrate (28,800 gallons per 24 hours) is sent to the unit for generating ammonium sulfate where approximately 25,000 gallons of aqua ammonia and 19,000 pounds of metal free ammonium sulfate is generated which is usable as fertilizer.

This test also generated approximately 0.144 lbs of 33% metal cake per gallon. At 1200 gallons per minute flow rate, approximately 250,000 lbs. of metal cake would be produced per 24 hours. (containing 50% moisture)

EXAMPLE 2

Iron Mountain Mine, Redding, Calif. 3 Gallon Test

A three gallon test sample of AMD, pH 2.9, from the Iron Mountain Mine was treated sequentially in three ionic state modification reactors. These reactors had intra-electrode potentials of 10 volts, 15.5 volts and 54 volts respectively.

The treatment times within the reactors is governed by the concentration of each metal ion that is subject to ion state modification The pretreated AMD is mixed with $Mg(OH)_2$ whereby pure base is generated by this process. The pH is raised to 8.5 and allowed to digest for a period up to 30 minutes.

The treated AMD is put into a clarification unit where the insoluble sludge of metal hydroxide is separated from the treated water.

| UNTREATED AMD FROM IRON MTN MINE AVERAGE SAMPLE | | |
|---|---|---|
| EPA 200.7 | Al | 294.0 parts per million |
| EPA 200.8 | As | 2.6 parts per million |
| EPA 200.9 | Cd | 2.5 parts per million |
| EPA 200.7 | Cu | 185.0 parts per million |
| EPA 200.7 | Pb | >1.0 parts per million |
| EPA 200.7 | Ni | 1.0 parts per million |
| EPA 200.7 | Zn | 550.0 parts per million |
| EPA 300.0 | $SO_4$ | 58600 parts per million |

The demetallized AMD was tested and the residual metal contents were below 50 parts per billion.

After treatment with the demetallizing step, the results of the test were

| | | | |
|---|---|---|---|
| EPA 200.7 | Al | ND > 50 | parts per billion |
| EPA 200.8 | As | 11 > 2 | parts per billion |
| EPA 200.9 | Cd | ND > 10 | parts per billion |
| EPA 200.7 | Cu | ND > 50 | parts per billion |
| EPA 200.7 | Pb | ND > 5 | parts per billion |
| EPA 200.7 | Ni | ND > 10 | parts per billion |
| EPA 200.7 | Zn | ND > 50 | parts per billion |
| EPA 300.0 | SO$_4$ | 27,000 | parts per million |

The three gallons of demetallized water from the Iron Mtn. Mine was treated with a V-Sep membrane unit.

Approximately 1.9 gallons of water passed through the unit as dischargeable water.

After two stage treatment of AMD from Iron Mtn Mine

| | | | |
|---|---|---|---|
| EPA 200.7 | Al | ND > 50 | parts per billion |
| EPA 200.8 | As | 11 > 20 | parts per billion |
| EPA 200.9 | Cd | ND > 10 | parts per billion |
| EPA 200.7 | Cu | ND > 50 | parts per billion |
| EPA 200.7 | Pb | ND > 5 | parts per billion |
| EPA 200.7 | Ni | ND > 10 | parts per billion |
| EPA 200.7 | Zn | ND > 50 | parts per billion |
| EPA 300.0 | SO$_4$ | 53 | parts per million |

EXAMPLE 3

Leviathon Mine Pond #3 Test at 4½ Gallons

A 4½ gallon test sample of AMD from the Leviathan mine (pH 3.9) was treated sequentially in three ionic state modification reactors. These reactors had an intra electrode potential of 10 volts, 15.5 volts and 54 volts respectively.

The treatment times within the reactors was governed by the concentration of the respective metal ion subject to ion state modification.

The pretreated AMD is mixed with Mg(OH)$_2$ so as to generate pure base during the course of which the Ph is raised to 8.5. The mixture is permitted to digest for about thirty minutes.

The treated AMD was was passed through a clarification unit where the sludge of metal; hydroxide was separated from the treated water.

| UNTREATED AMD FROM THE LEVIATHAN MINE POND #3 | | |
|---|---|---|
| method | analyte | Results |
| EPA 200.7 | Al | 420000 parts per billion |
| EPA 200.8 | As | 7000 parts per billion |
| EPA 200.9 | Cu | 3500 parts per billion |
| EPA 200.7 | Fe | 830,000 parts per billion |
| EPA 200.7 | Ni | 7,400 parts per billion |
| EPA 300.0 | SO$_4$ | 5900 parts per million |

The demetallized AMD was tested and the residual hazardous metals were all below 100 parts per billion but aluminum still remained at 2500 parts per per billion.

| De Metallized- Treated Water from Leviathan Mine Pond #3 | | |
|---|---|---|
| method | analyte | Results |
| EPA 200.7 | Al | 2500 parts per billion |
| EPA 200.8 | As | 33 parts per billion |
| EPA 200.9 | Cu | ND > 100 parts per billion |
| EPA 200.7 | Fe | 540 parts per billion |
| EPA 200.7 | Ni | ND > 100 parts per billion |
| EPA 300.0 | SO$_4$ | 5500 parts per million |

| After demetallizing and V-Sep Treatment | | |
|---|---|---|
| method | analyte | Results |
| EPA 200.7 | Al | ND > 100 parts per billion |
| EPA 200.8 | As | ND > 20 parts per billion |
| EPA 200.9 | Cu | ND > 100 parts per billion |
| EPA 200.7 | Ni | ND > 100 parts per billion |
| EPA 300.0 | SO$_4$ | 4400 parts per million |

The 3.5 gallons of demetallized AMD were treated with a V-Sep membrane unit. 2.65 gallons of dischargeable effluent were generated having a sulfate concentration less than 50 parts per million and 0.85 gallons of concentrated sulfate water was generated. This concentrate contained approximately 80,000 parts per million sulfates which is ideal for use as liquid fertilizer.

The foregoing specification describes a method and apparatus that the examples have shown offer a very economical and efficient system for solving a monstrous problem particularly facing residents of the western art of the United States. An important feature of the invention is the generation of a "high pH effluent" in the second section of the apparatus that is pumped by pump 84 back into reservoir 26 from where it is added to AMD in mixer 20 in the first section of the apparatus in order to precipitate metal contamirnants removed by filter press 36. Analysis of the "high pH effluent" by an independent laboratory have found a mass ratio (OH)/K=425'/20.7 as measured and reported by the Engineering Reasearch Institute whose report is hereby incorporated as reference into this specification. The use of the high pH effluent of the present invention in place of precipitating agents (e.g., Ca(OH)$_2$ used in state of the art processes avoids generattion of a substantial amount of the waste sludge that characterize the state of the art processss.

In view of the above, the compound, high pH effluent, shall be understood in the context of this specification to mean an aqueous solution in which there are no detectable cations, other than potassium and the mass ratio of OH to K is about 426/20 when measured using the technique described in the referenced report of the Engineering Research Institute.

The economic characteristics of the process is further inherent inview of the commercial value of the by-products (in addition to pure water) produced by the invention Variations and modifications of the process may be contemplated after reading the specification and studying the drawings which are within the scope of the invention. We therefore wish to define the scope of our invention by the scope of the appended claims.

What is claimed is:

1. An apparatus for treating a stream of contaminated water characterized by a high content of sulfuric acid and contaminating metal which comprises:

means for adding a precipitating agent to said stream of contaminated water;

said agent being a mixture of a double hydroxide of a first metal and a high pH effluent;

said agent added in an operable amount to produce a slurry of a hydroxide of said first metal and contaminant metal in high sulfate ladened water;

means for separating said slurry into a stream of high sulfate ladened water and a cake of hydroxide of said first metal and said contaminating metal;

means for separating said sulfate laden water into one stream of purified water and another stream of sulfate ladened water;

means for adding ammonia to one portion of said another stream of sulfate ladened water in an operable arrangement to produce aqueous ammonia and a cake of ammonia sulfate;

means for adding a double hydroxide of a second metal to a remaining portion of said another stream of sulfate ladened water in an operable arrangement to provide a cake of sulfate of said second metal and said high pH effluent;

means for mixing said high pH effluent and said double hydroxide of a first metal whereby said precipitating agent is formed;

means for delivering said precipitating agent to said means for adding a precipitating agent.

2. The apparatus of claim 1 wherein said means for adding a precipitating agent comprises means for adding said agent to product a slurry of a hydroxide of said first metal and contaminant metal in sulfate ladened water having a sulfate content of greater than 80,000 parts per million.

3. The apparatus of claim 1 wherein said means for separating said sulfate laden water comprises means for separating said stream into one stream of water having a sulfate content of less than than 55 parts per million and another stream of sulfate ladened water.

4. The apparatus of claim 1 wherein said means for adding a precipitating agent being a mixture of a double hydroxide of a first metal and a high pH effluent comprises means for adding magnesium and a high pH effluent.

5. The apparatus of claim 1 wherein said means for adding a double hydroxide of a second metal_{is} comprises means for adding calcium.

6. The apparatus of claim 1 wherein said means for adding a precipitating agent being a mixture of a double hydroxide of said first metal and a high pH effluent comprises means for adding one of calcium and magnesium and a high pH effluent and said means for adding a double hydroxide of said second metal comprises means for addimg one of calcium and magnesium.

7. The apparatus of claim 1 wherein said apparatus for treating a stream of contaminated water characterized by a high sulfuric acid and metal sulfate content comprises apparatus for treating acid mine drainage.

8. The apparatus of claim 1 wherein said means for adding said precipitating agent comprises:

a mixer having an entrance and an exit;

a reservoir for storing said precipitating agent;

means for delivering said precipitating agent from said reservoir to said mixer;

a digestion tank in which a mixture of precipitated double hydroxide of said first metal and hydroxide of said contaminant metal mixed in sulfate ladened water is formed;

means communicating with said digestion tank for separating said precipitated hydroxide of a first metal and a hydroxide of said contaminant metal from said demetallized water;

means for separating sulfate ladened water from pure water whereby pure water is delivered from said system and sulfate laden water is generated.

9. The apparatus of claim 8 wherein said means for separating said precipitated hydroxide of a first metal and a hydroxide of said contaminant metal from said demetallized water comprises a settling tank.

10. The apparatus of claim 8 wherein said means for separating sulfate ladened water from pure water comprises a tangential filtration system.

11. The apparatus of claim 8 wherein said means for delivering said precipitating agent from said reservoir to said mixer comprises:

a valve arranged to regulating flow from said reservoir to said mixer;

a first upstream pH sensor connected to an upstream side of said mixer;

a first downstream pH sensor connected to a downstream side of said mixer;

a controller connected to control flow through said valve and responsive to signals from said first upstream pH sensor and said first downstream sensor.

12. The apparatus of claim 1 further comprising at least one ion state modification reactor arranged to permit passing said stream of contaminated water through said at least one reactor before said stream of contaminated water passes through means for adding a precipitating agent to said contaminated water.

13. The apparatus of claim 12 wherein said ion state modification reactor comprises:

a container enclosing a chamber;

at least one pair of electrodes in said chamber;

said at least one pair of electrodes adapted for having an electrical potential applied across said at least one pair of electrodes.

14. The apparatus of claim 13 wherein said electrodes are carbon.

15. The apparatus of claim 13 wherein:

said at least one reactor is a first reactor, a second reactor and a third reactor;

said electrical potential applied between said electrodes in said first reactor is selected from a range of voltages between 9 and 12 volts;

said electrical potential applied between said electrodes in said second reactor is selected from a range of voltages between 24 and 40 volts;

said electrical potential applied between said electrodes in said third reactor is selected from a range of voltages between 24 and 40 volts.

16. The apparatus of claim 1 wherein said means for separating said sulfate laden water into one stream of purified water and another stream of sulfate ladened water is a proportioning valve.

17. The apparatus of claim 1 wherein said means for adding ammonia to one portion of said another stream of sulfate ladened water in an operable arrangement to produce aqueous ammonia and a cake of ammonia sulfate comprises:

a source of ammonia;

a mixer for adding ammonia to said stream of sulfate ladened water;

a valve arranged to regulating flow from said source of ammonia to said mixer for adding ammonia to said stream of sulfate ladened water;

an upstream pH sensor connected to an upstream side of said mixer for adding ammonia to said stream of sulfate ladened water;

a downstream pH sensor connected to an upstream side of said mixer for adding ammonia to said stream of sulfate ladened water;

a controller connected to control flow through said valve and responsive to signals from said first upstream pH sensor and said first downstream sensor.

18. An apparatus for treating a stream of contaminated water characterized by a high content of sulfuric acid and contaminating metal which comprises:

means for adding a precipitating agent to said stream of contaminated water;

said agent being a mixture of a double hydroxide of a first metal and a high pH effluent;

said agent added in an operable amount to produce a slurry of a hydroxide of said first metal and contaminant metal in high sulfate laden water;

means for separating said slurry into a stream of high sulfate ladened water and a cake of hydroxide of said first metal and said contaminating metal, means for separating said sulfate laden water into one stream of purified water and another stream of sulfate ladened water.

19. The apparatus of claim 18 wherein said means for adding said precipitating agent comprises:

a mixer having an entrance and an exit;

a reservoir for storing said precipitating agent;

means for delivering said precipitating agent from said reservoir to said mixer;

a digestion tank in which a mixture of precipitated double hydroxide of said first metal and hydroxide of said contaminant metal mixed in sulfate ladened water is formed;

means communicating with said digestion tank for separating said precipitated hydroxide of a first metal and a hydroxide of said contaminant metal from said demetallized water;

means for separating sulfate ladened water from pure water whereby pure water is delivered from said system and sulfate laden water is generated.

20. The apparatus of claim 19 wherein said means for separating said precipitated hydroxide of a first metal and a hydroxide of said contaminant metal from said demetallized water comprises a settling tank.

21. The apparatus of claim 18 wherein said means for separating sulfate ladened water from pure water comprises a filter.

22. The apparatus of claim 18 wherein said means for delivering said precipitating agent from said reservoir to said mixer comprises:

a valve arranged to regulating flow from said reservoir to said mixer;

a first upstream pH sensor connected to an upstream side of said mixer;

a first downstream pH sensor connected to a downstream side of said mixer;

a controller connected to control flow through said valve and responsive to signals from said first upstream pH sensor and said first downstream sensor.

23. The apparatus of claim 18 further comprising at least one ion state modification reactor arranged to permit passing said stream of contaminated water through said at least one reactor before said stream of contaminated water passes through means for adding a precipitating agent to said contaminated water.

24. The apparatus of claim 18 wherein said ion state modification reactor comprises:

a container enclosing a chamber;

at least one pair of electrodes in said chamber;

said at least one pair of electrodes adapted for having an electrical potential applied across said at least one pair of electrodes.

25. The apparatus of claim 24 wherein said electrodes are carbon.

26. The apparatus of claim 24 wherein:

said at least one reactor is a first reactor, a second reactor and a third reactor;

said electrical potential applied between said electrodes in said first reactor is selected from a range of voltages between 9 and 12 volts;

said electrical potential applied between said electrodes in said second reactor is selected from a range of voltages between 24 and 40 volts;

said electrical potential applied between said electrodes in said third reactor is selected from a range of voltages between 24 and 40 volts.

27. An apparatus for treating a stream of contaminated water characterized by a high content of sulfuric acid and contaminating metal which comprises:

a mixer having an entrance and an exit;

a first reservoir communicating with said mixer for storing a precipitating agent for addition to said mixer;

said agent being a mixture of a double hydroxide of a first metal and a high pH effluent, a valve arranged to regulate flow from said reservoir to said mixer;

a first upstream pH sensor connected to an upstream side of said mixer;

a first downstream pH sensor connected to a downstream side of said mixer;

a controller connected to control flow of said precipitating agent through said valve and responsive to signals from said first upstream pH sensor and said first downstream sensor whereby said agent is added in an operable amount to said stream in said mixer to produce a mixture of a hydroxide of said first metal and contaminant metal in high sulfate laden water;

a digestion tank comunicatin with said mixer for converting said mixture to a slurry of precipitated hydroxide of said first metal and hydroxide of said contaminant metal mixed in sulfate ladened water;

a settling tank communicating with said digestion tank for settling said precipitated hydroxide of a first metal and a hydroxide of said contaminant metal from said sulfate ladened water;

a filter connected to said settling tank for separating sulfate ladened water from pure water whereby pure water is delivered from said system and sulfate laden water is generated;

a proportioning valve communicating with said filter for dividing said sulfate laden water into a first portion and a second portion;

a second mixer arranged for adding ammonia to said first portion whereby a precipitate of ammonia sulfate in aqueous ammonia is generated;

a filter press connected to said second mixer for extracting cake of precipitated ammonia from said first portion;

a repository connected to said second mixer for receiving said aqueous ammonia from said second mixer;

a third mixer arranged to mix said second portion with calcium hydroxide;

another valve arranged to regulate addition of calcium hydroxide slurry from said repository to said third mixer;

a sensor connected upstream from said third mixer;

another pH controller arranged to control said another valve and responsive to signals from said sensor connected upstream from said third mixer and sensor connected upstream from said third mixer;

a third filter press connected to said third mixer for generating cake of calcium sulfate conveyed away from said filter press;

a pump connected to pump high pH effluent back to said first reservoir for addition to said first reservoir.

* * * * *